(12) United States Patent
Duffy et al.

(10) Patent No.: US 11,415,526 B2
(45) Date of Patent: Aug. 16, 2022

(54) MULTI-CONTROLLER INSPECTION SYSTEM

(71) Applicant: KLA Corporation, Milpitas, CA (US)

(72) Inventors: Brian Duffy, San Jose, CA (US); Mark Roulo, Milpitas, CA (US); Ashok Mathew, Milpitas, CA (US); Jing Zhang, Santa Clara, CA (US); Kris Bhaskar, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/136,919

(22) Filed: Dec. 29, 2020

(65) Prior Publication Data

US 2021/0349038 A1    Nov. 11, 2021

Related U.S. Application Data

(60) Provisional application No. 63/020,555, filed on May 6, 2020.

(51) Int. Cl.
   *G01N 21/95* (2006.01)
   *G01N 21/88* (2006.01)

(52) U.S. Cl.
   CPC ..... *G01N 21/9501* (2013.01); *G01N 21/8806* (2013.01)

(58) Field of Classification Search
   CPC ...................... G01N 21/8806; G01N 21/9501
   USPC .................................................. 356/356, 243
   See application file for complete search history.

(56) References Cited

U.S. PATENT DOCUMENTS

| | | | |
|---|---|---|---|
| 9,183,624 B2 | 11/2015 | Karsenti et al. |
| 9,222,895 B2 | 12/2015 | Duffy et al. |
| 9,541,824 B1 | 1/2017 | Fang et al. |
| 2013/0231769 A1 | 9/2013 | Tien et al. |
| 2016/0150191 A1 | 5/2016 | Karsenti et al. |
| 2017/0193680 A1 | 7/2017 | Zhang et al. |

(Continued)

FOREIGN PATENT DOCUMENTS

| | | | | |
|---|---|---|---|---|
| CN | 110889338 A | * | 3/2020 | ......... G06K 9/00664 |
| KR | 20120095429 A | * | 8/2012 | ............... G06T 1/00 |

OTHER PUBLICATIONS

PCT International Search Report and Written Opinion for International Application No. PCT/US2021/030746 dated Aug. 27, 2021, 7 pages.

*Primary Examiner* — Tri T Ton

(74) *Attorney, Agent, or Firm* — Suiter Swantz pc llo

(57) ABSTRACT

An inspection system is disclosed. The inspection system includes a shared memory configured to receive image data from a defect inspection tool and a controller communicatively coupled to the shared memory. The controller includes a host image module configured to apply one or more general-purpose defect-inspection algorithms to the image data using central-processing unit (CPU) architectures, a results module configured to generate inspection data for defects identified by the host image module, and secondary image module(s) configured to apply one or more targeted defect-inspection algorithms to the image data. The secondary image module(s) employ flexible sampling of the image data to match a data processing rate of the host image module within a selected tolerance. The flexible sampling of the image data is adjusted responsive to the inspection data generated by the results module and the host image module.

29 Claims, 6 Drawing Sheets

(56) References Cited

U.S. PATENT DOCUMENTS

2017/0200265 A1 7/2017 Bhaskar et al.
2018/0106732 A1 4/2018 Plihal et al.
2018/0107928 A1 4/2018 Zhang et al.
2018/0164792 A1 6/2018 Lin et al.

* cited by examiner

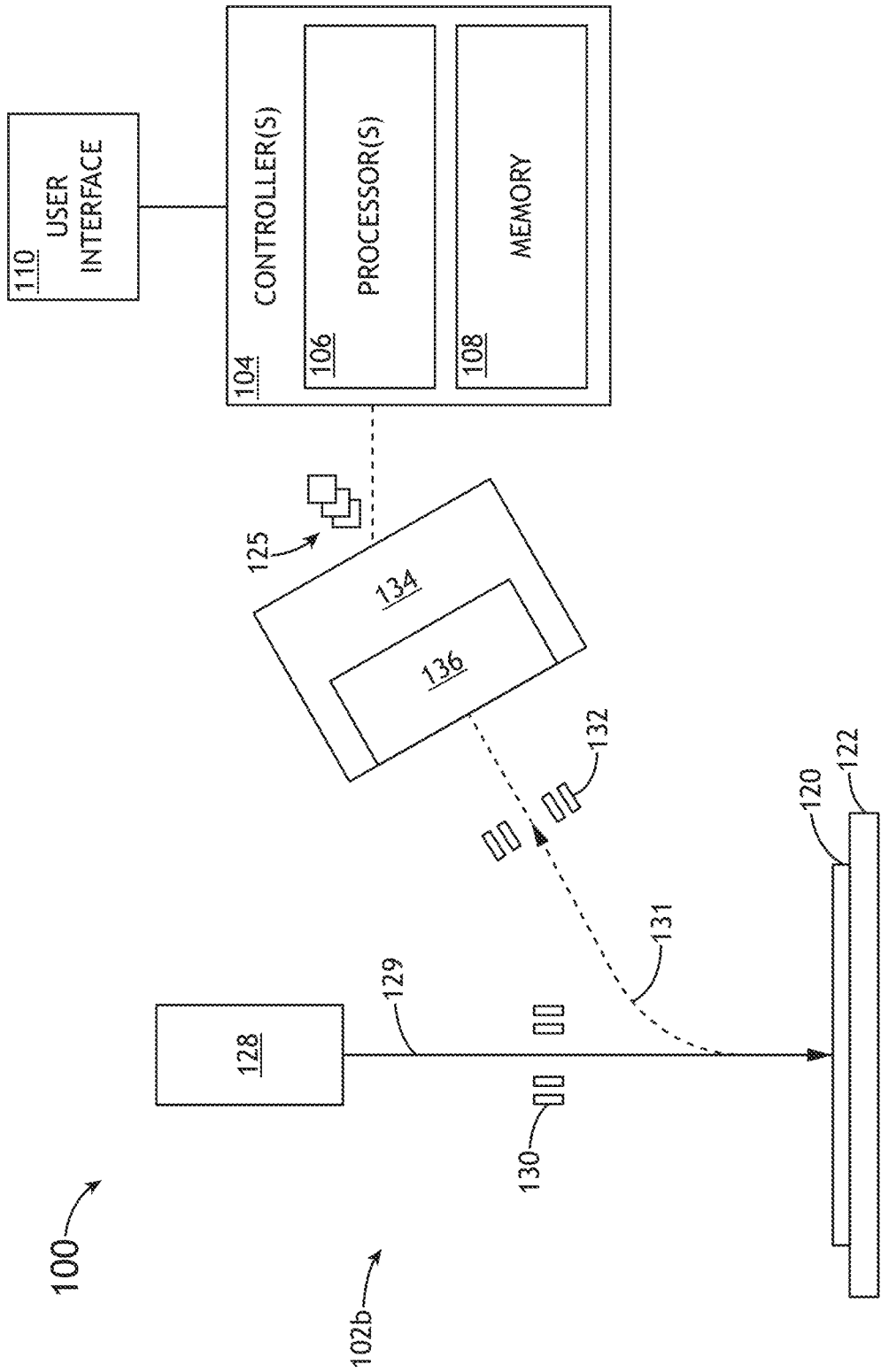

MULTI-CONTROLLER INSPECTION SYSTEM

CROSS-REFERENCE TO RELATED APPLICATION

The present application claims the benefit under 35 U.S.C. § 119(e) of U.S. Provisional Application Ser. No. 63/020,555 filed May 6, 2020, entitled SLAVE MODE IMAGE COMPUTER WITH FLEXIBLE SAMPLING, naming Brian Duffy, Mark Roulo, Ashok Mathew, Jing Zhang and Kris Bhaskar as inventors, which is incorporated herein by reference in the entirety.

TECHNICAL FIELD

The present disclosure generally relates to the detection of defects in semiconductor wafers and masks, and, in particular, a distributed heterogeneous computer system employing multiple defect-inspection algorithms that benefit from different software and hardware computing resource environments.

BACKGROUND

In a conventional inspection system configured to detect defects on a sample (e.g., a semiconductor wafer or photomask), an illumination source illuminates the sample and a detector (e.g., a camera) receives illumination that is reflected or scattered from the sample. The detector generates image data, and the image data is then transmitted to a computer system. The computer system then detects defects using the image data. Due to the wide variety of possible defects, some defects are difficult to detect and may be missed. Additionally, even for the defects that can be possibly identified, detection may be too computationally intensive to be economically viable.

Furthermore, for backwards compatibility reasons, it may be desirable to modify and improve the defect inspection portion of an inspection system without changing the image acquisition portion of the system. For inspection systems that are fully-designed or deployed to production, the disruption of operations to replace defect-inspection algorithms and associated computing systems can be impractical for the inspector manufacturer as well as for the customer. The introduction of promising new algorithms and computing technology can be substantially delayed or foregone altogether in such situations. Thus, an improved defect-inspection system is desirable.

SUMMARY

An inspection system is disclosed in accordance with one or more illustrative embodiments of the present disclosure. In one illustrative embodiment, the inspection system comprises a shared memory communicatively coupled to a defect inspection tool, wherein the shared memory is configured to receive image data generated by the defect inspection tool. In another illustrative embodiment, the inspection system comprises a controller communicatively coupled to the shared memory including: a host image module configured to apply one or more general-purpose defect-inspection algorithms to the image data, wherein the one or more general-purpose defect-inspection algorithms are configured to identify a plurality of defect types in the image data using central-processing unit (CPU) architectures, wherein the host image module fully samples the image data; one or more secondary image modules, wherein the one or more secondary image modules are configured to apply one or more targeted defect-inspection algorithms to the image data, wherein at least some of the one or more targeted defect-inspection algorithms are tailored to identify a targeted subset of the plurality of defect types in the image data, wherein the one or more secondary image modules employ flexible sampling of the image data to match a data processing rate of the host image module within a selected tolerance; and a results module configured to generate inspection data for defects identified by the one or more host image modules or the one or more secondary image modules.

An inspection system is disclosed in accordance with one or more illustrative embodiments of the present disclosure. In one illustrative embodiment, the inspection system comprises a shared memory communicatively coupled to a defect inspection tool, wherein the shared memory is configured to receive image data generated by the defect inspection tool. In another illustrative embodiment, the inspection system comprises a controller communicatively coupled to the shared memory including: a host image module configured to apply one or more general-purpose defect-inspection algorithms to the image data, wherein the one or more general-purpose defect-inspection algorithms are configured to identify a plurality of defect types in the image data using central-processing unit (CPU) architectures, wherein the host image module fully samples the image data; one or more secondary image modules, wherein the one or more secondary image modules are configured to apply one or more targeted defect-inspection algorithms to the image data, wherein at least some of the one or more targeted defect-inspection algorithms are tailored to identify a targeted subset of the plurality of defect types in the image data, wherein the one or more secondary image modules employ flexible sampling of the image data to match a data processing rate of the host image module within a selected tolerance, wherein the flexible sampling of the image data is adjusted responsive to the inspection data generated by the results module and the host image module, wherein the results module is further configured to generate inspection data for defects identified by the one or more secondary image modules.

An inspection system is disclosed in accordance with one or more illustrative embodiments of the present disclosure. In one illustrative embodiment, the inspection system comprises a shared memory communicatively coupled to a defect inspection tool, wherein the shared memory is configured to receive image data generated by the defect inspection tool. In another illustrative embodiment, the inspection system comprises a controller communicatively coupled to the shared memory including: a plurality of image modules, each configured to apply one or more defect-inspection algorithms to the image data; and a results module configured to generate inspection data for defects identified by the plurality of image modules, wherein the plurality of image modules employ flexible sampling of the image data to maintain a targeted data processing within a selected tolerance, wherein the flexible sampling of the image data is adjusted responsive to the inspection data generated by the results module and the plurality of image modules.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 2B is a diagram illustrating an electron-based inspection tool, in accordance with one or more embodiments of the present disclosure.

DETAILED DESCRIPTION OF THE INVENTION

Figure 1:
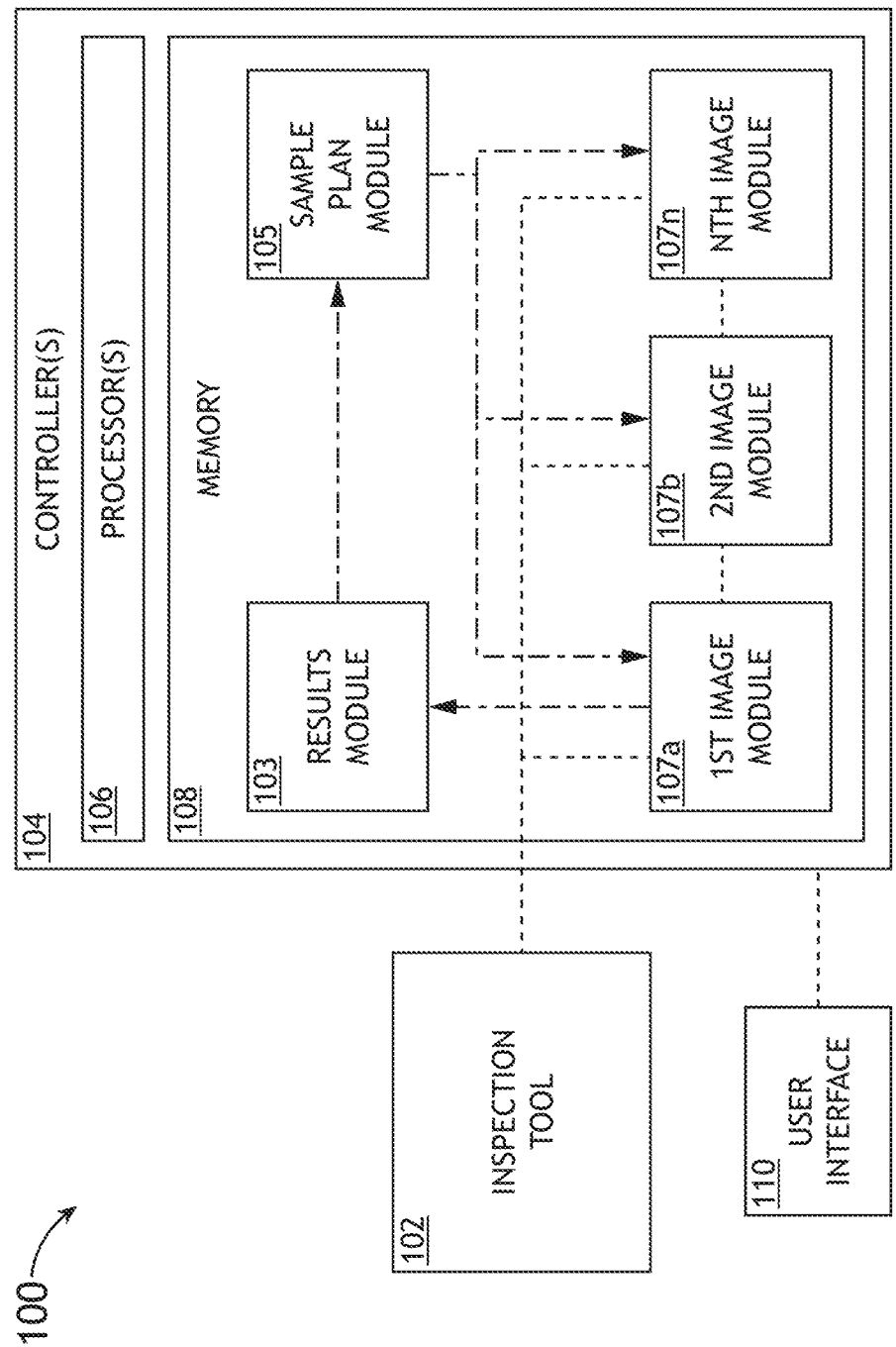
FIG. 1 is a block-diagram illustrating an inspection system for detecting defects, in accordance with one or more embodiments of the present disclosure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to an inspection system configured to detect defects on a sample (e.g., a semiconductor wafer or a photomask) by inspecting image data collected by an inspection tool. The present inspection system advantageously enables the quick and efficient detection of defects using both general-purpose defect-inspection algorithms and targeted defect-inspection algorithms. In particular, the present system may employ flexible sampling of the image data to maintain a high data processing rate of the inspection system (e.g., to maintain an inspection volume for a manufacturing line at a semiconductor fabrication plant). Since targeted defect-inspection algorithms may have slower inspection rates than general-purpose defect-inspection algorithms, flexible sampling enables faster inspections by providing less image data to the targeted inspection algorithms than is provided to the general-purpose inspection algorithms. Flexible sampling may be implemented in various ways including simply dropping inspection jobs to match the data processing rate of the targeted defect-inspection algorithms to the data processing rate of the general-purpose inspection algorithms (and/or the incoming data stream), or targeting certain areas of the image data where the targeted defect-inspection algorithms may be most effective.

It is contemplated that a general-purpose algorithm (for example, executed by a host inspector or computer) may inspect a full sample of the image data for a plurality of defect types (for example, using a CPU-based architecture) and that targeted defect-inspection algorithms (executed by other computers, or the host inspector) may inspect subsamples of the full sample for targeted defect types (for example, using machine learning and a GPU-based architecture). A subsample may be distributed to the targeted defect-inspection algorithms based on the probability of a specific defect type occurring in an area of the sample (e.g., a care area or an area-of-interest). For example, systematic defects based on the physical design of the chip may occur more frequently in certain care areas of a semiconductor wafer die, and therefore, the targeted defect-inspection algorithms may inspect subsamples focusing entirely on these care areas of the full sample.

FIG. 1 illustrates an inspection system 100 for determining defects on a surface of a sample (e.g., a semiconductor wafer or photomask). The system 100 may include one or more inspection tools 102, one or more controllers 104, one or more processors 106, a memory 108, and a user interface 110. The one or more processors 106 may execute program instructions stored on the memory 108. The program instructions may include various modules (i.e., software programs), each performing a different function, procedure, algorithm, etc.

In some embodiments, the inspection tool 102 may include, but is not limited to, an optical-based inspection system, a charged particle-based inspection system, and the like. For instance, the inspection tool 102 may include a broadband inspection system (e.g., broadband plasma inspection system) or a narrowband inspection system (e.g., laser-based inspection system). In another instance, the inspection tool 102 may include a scanning electron microscopy (SEM) inspection system. The inspection tool 102 may be configured to store collected image data in a shared memory (not shown). It is noted that the shared memory may be directly coupled (i.e., connected to the same motherboard and/or within the same housing) to one of the controller(s) 104. In some embodiments, the shared memory may be located remotely from the controllers 104 as part of a compute cluster or cloud-computing system. In some embodiments, the shared memory may be located on-premises with the controllers 104 for fast throughput of a large volume of data.

The controllers 104 (i.e., computers or computing systems) may receive the image data from the shared memory. The controllers 104 may be configured to detect one or more defects on a sample by applying one or more defect-inspection algorithms to the image data (e.g., by inputting the image data and executing the algorithms). The defect-inspection algorithms may be stored as program instructions (e.g., one or more image modules 107a-n) in the memory 108 of the controllers 104, and may be executed by the processors 106 of the controllers 104. In some embodiments, all of the image modules 107a-n may be executed by a single controller 104. In some embodiments, each one of the image modules 107a-n may be executed by a respective one of the controllers 104. In other embodiments, one or more image modules 107a-n may be executed by a first controller 104, other module(s) 107a-n may be executed by a second controller 104, etc. It is contemplated herein that a wide variety of configurations of image modules 107a-n and controllers 104 may be implemented.

In some embodiments, the one or more controllers 104 may comprise a single controller executing both general-purpose inspection algorithms and targeted inspection algorithms. In other embodiments, the controllers 104 may comprise a plurality of controllers (i.e., a distributed computing system, a parallelized computing system, a network of controllers, a cloud-computing system, etc.). In some embodiments, the controllers 104 may be organized in a hierarchical manner. For example, a primary or host controller 104 may execute a general-purpose defect-inspection algorithm (e.g., host image module 107*a*), and the image data may be flexibly sampled and distributed to secondary controllers 104 executing targeted defect-inspection algorithms (e.g., secondary image modules 107*b-n*). It is noted herein that the terms "algorithm" and "algorithms" may be construed as interchangeable, and that the execution of a single algorithm does not preclude the execution of a plurality of algorithms, and vice versa.

In some embodiments, one or more of the controller(s) 104 may execute general-purpose defect-inspection algorithms. The general-purpose defect-inspection algorithms may be configured to detect a wide variety of defect types on a sample. In some embodiments, the general-purpose defect-inspection algorithms may be executed on a primary or host computer and may identify a relatively large number of potential defects in an area of the sample (e.g., 99% of the detected defects may actually be nuisance or noise). The image identified with the large number of potential defects may be flagged for further processing by a targeted defect-inspection algorithm (e.g., to verify whether the defects detected by the general-purpose algorithm are actual defects or noise). In some embodiments, the general-purpose defect-inspection algorithms may be executed using a central processing unit (CPU) architecture. A CPU may include an arithmetic logic unit (ALU) that performs arithmetic and logic operations, processor registers that supply operands to the ALU and store the results of ALU operations, and a control unit that orchestrates the fetching (from memory) and execution of instructions by directing the coordinated operations of the ALU, registers and other components.

In some embodiments, one or more of the controllers 104 may execute targeted defect-inspection algorithms. The targeted defect-inspection algorithms may be tailored or adapted to detect specific types of defects. In some embodiments, the targeted defect-inspection algorithms may be executed using a graphics processing unit (GPU), a field-programmable gate array (FPGA), an application-specific integrated circuit (ASIC) or other parallel processing architecture (e.g., non-CPU math accelerator). The GPU may be a parallel system based on the single-instruction-multiple-data (SIMD) paradigm. The SIMD paradigm represents computer systems with multiple processors that perform the same operation on multiple data in parallel. Using the Compute Unified Device Architecture (CUDA®; trademark of Nvidia Corporation, Santa Clara, Calif.), the parallel computing power of the GPU may be utilized for non-graphical problems. The GPU may comprise hundreds of multiprocessors (MPs), where each MP comprises, for example, 8 single processors. A CUDA block may be mapped to a MP and the MPs may operate in parallel. It is noted that other parallel processing architectures are possible, and that the present disclosure is not limited to any particular parallel processing architecture, or any particular combination of hardware or software.

In some embodiments, the targeted defect-inspection algorithms may comprise machine learning algorithms (e.g., that utilize neural networks or deep-learning). The machine learning algorithms may be substantially similar or identical to the machine learning models described in U.S. Pat. Appl. Publ. Nos. 2018/0107928 published Apr. 19, 2018 by Zhang et al., 2017/0200265 published Jul. 13, 2017 by Bhaskar et al., and 2017/0193680 published Jul. 6, 2017 by Zhang et al, which are incorporated by reference herein in their entirety. The machine learning algorithms may improve automatically through experience and may construct a mathematical model based on training data (e.g., test images collected by the inspection tool 102) to make predictions or decisions without being explicitly programmed to do so. In some embodiments, the predictions may be classifications of features or patterns in the image as types of defects.

In one example, the machine learning algorithms may classify a given area of a semiconductor wafer die into two categories: (1) containing at least one defect, or (2) not containing any defects. In this way, the machine learning algorithms may identify features in an image as defects, even if the features have not previously been matched or correlated to that type of defect. Further, the machine learning algorithms may classify the care area by defect type: (1) containing a resist-dot defect, (2) containing a scratch defect, (3) containing a bridge defect, etc.

In some embodiments, a sample plan module 105 may generate and distribute inspection jobs (e.g., isolated tasks or workloads to be distributed to the image modules 107*a-n* for defect-inspection). An inspection job may be associated with (1) a test image of an area of the sample to be inspected for defects (e.g., a portion of the image data), (2) one or more reference images for the test image (e.g., for comparison to the test image), and (3) context data for supervised image segmentation (e.g., classification of areas of the test image as containing defects or not containing defects). The test image potentially containing defects may be, for example, an image of a die on a wafer, an image of a care area on the die, etc. The one or more reference images may be subtracted from the test image to reveal defective pixels. In some embodiments, the test image and the one or more reference images may capture care areas of the sample that have substantially identical design patterns. In some embodiments, the one or more reference images may be acquired from previous inspections (e.g., of the same wafer or a different wafer) or from design data, and may be fed from an external data source. In some embodiments, images are designated as a test image or a reference image interchangeably (e.g., using arbitration or voting to determine which image the detected defect is occurring when a difference is detected).

In some embodiments, each image module 107*a-n* may be contained on the memory of a separate, respective controller 104, and, when executed, may receive a separate, respective inspection job to analyze for defects. In some embodiments, some of the image modules 107*a-n* may be executed by a first controller, others of the image modules 107*a-n* may be executed by a second controller, etc. In one illustrative configuration, a first controller 104 may execute a first image module 107*a* to detect pin-hole defects and resist-dot defects on the surface of a sample using a general-purpose defect-inspection algorithm. A second controller 104 may execute a second image module 107*b* to detect scratch defects using a targeted algorithm adapted to detect scratch defects. A third controller 104 may execute a third image module 107*c* to detect bridge defects using a targeted algorithm adapted to detect bridge defects. In this way, the appropriate algorithms tailored to specific defects types may be executed on the appropriate hardware to detect as many defects as possible (especially defects missed at earlier stages, e.g., by the general-purpose inspection algorithm).

In some embodiments, a results module 103 may generate inspection data based on the outputs of the image modules 107*a-n* (i.e., outputs of the defect-inspection algorithms). For example, the results module 103 may generate a list of defects identified by the general-purpose defect-inspection algorithm(s) and the targeted defect-inspection algorithm(s). The list of defects may report that zero defects are detected in an area of a wafer, or that one or more defects are detected in an area of a wafer, etc. In some embodiments, the inspection data includes separate datasets (e.g., lists) for at least some of the one or more general-purpose defect-inspection algorithms or at least some of the one or more targeted defect-inspection algorithms (in other words, separate lists of defects for the general-purpose algorithms and targeted algorithms). In some embodiments, the inspection data includes a common dataset for the one or more general-purpose defect-inspection algorithms and the one or more targeted defect-inspection algorithms (in other words, a combined list of defects that combines the outputs of the general-purpose algorithms and the targeted algorithms). If the inspection data includes the common dataset, each entry of the list may indicate which type of defect-inspection algorithm identified the defect (e.g., the general-purpose algorithm, a targeted algorithm for bridge defects, a targeted algorithm for stain defects, etc.)

In some embodiments, each entry of the list of defects may be associated with an inspection job, and may report (i) a test image of a care area of the sample, (ii) reference images for the test image, and (iii) inspection data related to a defect (e.g., type of defect, number of defective pixels, etc.). It is noted that the test images and the reference images are not required to be processed and stored on the same controller (i.e., stored on the same memory) as the sample plan module 105 or the results module 103, and that each inspection job and each entry of the list may refer to image data that is stored separately (e.g., on the shared memory). For example, the list may include pointers that store memory addresses (e.g., at a memory remote to the controller 104 executing the results module 103) where the test image and the reference image may be retrieved (e.g., to save valuable memory space on the controller 104). However, in some embodiments, the test image and the reference image may be stored on the same memory 108 of the same controller 104 executing the results module 103 and/or the sample plan module 105.

In some embodiments, the sample plan module 105 may generate and distribute inspection jobs to the image modules 107a-n based on the list of defects (e.g., to implement the flexible sampling of the image data). For example, if zero or no defects are detected in a care area using a general-purpose defect-inspection algorithm, the sample plan module may distribute an inspection job (e.g., the test image of the care area and the associated reference images and context data) to a controller executing a targeted defect-inspection algorithm (e.g., to verify or double-check the results of the general-purpose algorithm). Alternatively, if a care area is flagged as potentially containing defects using a general-purpose defect-inspection algorithm, the sample plan module may distribute the inspection job to a controller executing a targeted defect-inspection algorithm (e.g., to verify whether the general-purpose algorithm detected real defects instead of noise in the care area).

It is noted that the present disclosure is not limited to any one combination of the modules (e.g., image modules 107a-n, results module 103, and sample plan module 105) and controllers 104, and that any combination of the modules and the controllers 104 may be configured. For example, each of the controllers 104 may execute any number of the image modules 107a-n, results module 103, and/or sample plan module 105. In one illustrative embodiment, a host controller 104 executes a host image module 107a (e.g., executing the general purpose algorithm), and other controllers 104 execute secondary image modules 107b-n (e.g., executing the targeted algorithms).

In some embodiments, at least one of the image modules 107 is configured to employ flexible sampling of the image data by disregarding one or more inspection jobs to match a data processing rate of a host image module 107a within a selected tolerance. The data processing rate may be measured, for example, in wafers per hour (WPH) or flop/s (floating point operations per second) and may be associated with the production rate of a quality control manufacturing line (e.g., for semiconductor wafers, photomasks, etc.). In some embodiments, the data processing rate may be defined as an average data processing rate of the host image module 107a. In other embodiments, the data processing rate may be defined as a targeted processing rate (e.g., pre-defined by a user). By disregarding or skipping inspection jobs in a queue of inspection jobs, an image module 107 may be prevented from bottlenecking the rest of the inspection system.

It is contemplated herein that the number of executed image modules 107 and associated controllers may change dynamically over time depending on the acquisition of excess data and/or the results of the defect-inspection. For example, if the data acquisition rate (i.e., the rate at which the shared memory receives the image data from the inspection tool 102) exceeds the data processing rate (i.e., the rate at which the controllers 104 identify defects), additional image modules 107 (and, in some embodiments, controllers 104) may be recruited to process the excess image data. Additionally or alternatively, if the controllers 104 are not able to detect defects (i.e., detect zero defects) in a set of images, the set of images may be flagged as potentially containing defects (e.g., if a probability of a defect occurring is relatively high), and additional controller(s) 104 and/or image modules 107a-n may be recruited to analyze the set of images and potentially detect defects that are missed by the other controllers 104.

Figure 2A:
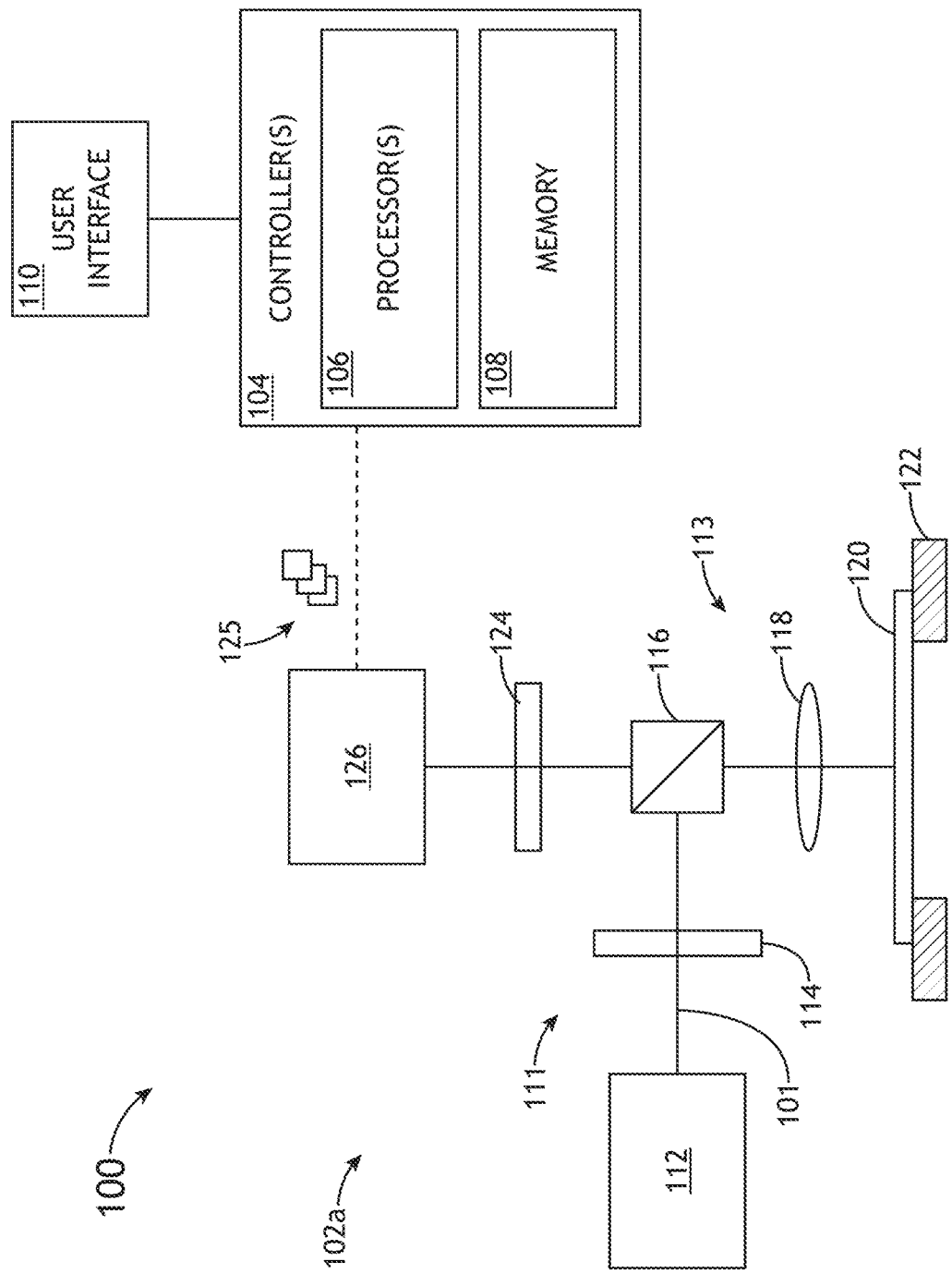
FIG. 2A is a diagram illustrating an optical-based inspection tool, in accordance with one or more embodiments of the present disclosure.

FIG. 2A illustrates a simplified schematic view of the system 100 for characterizing a sample, in accordance with one or more embodiments of the present disclosure. In particular, the system 100 as depicted in FIG. 2A includes an optical inspection tool 102a. The optical inspection tool 102a may include any optical-based inspection known in the art. For example, the inspection tool 102a may include an optical dark-field inspection tool. The optical inspection tool 102a may include, but is not limited to, an illumination source 112, an illumination arm 111, a collection arm 113, and a detector assembly 126.

In one embodiment, the optical inspection tool 102a is configured to inspect and/or measure the sample 120 disposed on the stage assembly 122. The illumination source 112 may include any illumination source known in the art for generating illumination 101 including, but not limited to, a broadband radiation source. In another embodiment, optical inspection tool 102a may include an illumination arm 111 configured to direct illumination 101 to the sample 120. It is noted that illumination source 112 of the optical inspection tool 102a may be configured in any orientation known in the art including, but not limited to, a dark-field orientation, a light-field orientation, and the like. For example, one or more optical elements 114, 124 may be selectably adjusted in order to configure the inspection tool 102a in a dark-field orientation, a bright-field orientation, and the like.

The sample 120 may include any sample known in the art including, but not limited to, a wafer, a photomask, and the like. In one embodiment, the sample 120 is disposed on a stage assembly 122 to facilitate movement of the sample 120. In another embodiment, the stage assembly 122 is an actuatable stage. For example, the stage assembly 122 may include, but is not limited to, one or more translational stages suitable for selectably translating the sample 120 along one or more linear directions (e.g., x-direction, y-direction and/or z-direction). By way of another example, the stage assembly 122 may include, but is not limited to, one or more rotational stages suitable for selectively rotating the sample 120 along a rotational direction. By way of another example, the stage assembly 122 may include, but is not limited to, a rotational stage and a translational stage suitable for selectably translating the sample 120 along a linear direction and/or rotating the sample 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a beam splitter 116, and an objective lens 118. In this regard, illumination arm 111 may be configured to focus illumination 101 from the illumination source 112 onto the surface of the sample 120. The one or more optical elements 114 may include any optical elements known in the art including, but not limited to, one or more mirrors, one or more lenses, one or more polarizers, one or more beam splitters, wave plates, one or more apodizers, and the like.

In another embodiment, optical inspection tool 102*a* includes a collection arm 113 configured to collect illumination reflected or scattered from sample 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the sample 120.

In another embodiment, the detector assembly 126 of the optical inspection tool 102 is configured to collect inspection data of the sample 120 based on illumination reflected or scattered from the sample 120. In another embodiment, the detector assembly 126 is configured to transmit collected/acquired images and/or metrology data to the controller 104*a*.

FIG. 2B illustrates a simplified schematic view of the system 100 for characterizing a sample 120, in accordance with one or more embodiments of the present disclosure. In particular, the system 100 as depicted in FIG. 2B, includes an electron-based inspection tool 102*b* such that system 100 operates as electron-based inspection system (e.g., a scanning electron microscopy (SEM) system).

In one embodiment, the electron-based inspection tool 102*b* is configured to perform one or more measurements on the sample 120. In this regard, the electron-based inspection tool 102*b* may be configured to acquire one or more images of the sample 120. The electron-based inspection tool 102*b* may include, but is not limited to, an electron beam source 128, one or more electron-optical elements 130, one or more electron-optical elements 132, and an electron detector assembly 134 including one or more electron sensors 136.

In one embodiment, the electron beam source 128 is configured to direct one or more electron beams 129 to the sample 120. The electron beam source 128 may form an electron-optical column. In another embodiment, electron beam source 128 includes one or more additional and/or alternative electron-optical elements 130 configured to focus and/or direct the one or more electron beams 129 to the surface of the sample 120. In another embodiment, electron-based inspection tool 102*b* includes one or more electron-optical elements 132 configured to collect secondary and/or backscattered electrons 131 emanated from the surface of the sample 120 in response to the one or more electron beams 129. It is noted herein that the one or more electron-optical elements 130 and the one or more electron-optical elements 132 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the electron-based inspection tool 102*b* is not limited to the electron-optical elements depicted in FIG. 2B, which are provided merely for illustrative purposes. It is further noted that the system 100 may include any number and type of electron-optical elements necessary to direct/focus the one or more electron beams 129 onto the sample 120 and, in response, collect and image the emanated secondary and/or backscattered electrons 131 onto the electron detector assembly 134.

For example, the system 100 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 129 relative to the surface of the sample 120. Further, the one or more scanning elements may be utilized to scan the one or more electron beams 129 across the sample 120 in a selected pattern.

In another embodiment, secondary and/or backscattered electrons 131 are directed to one or more sensors 136 of the electron detector assembly 134. The electron detector assembly 134 of the electron-based inspection tool 102 may include any electron detector assembly known in the art suitable for detecting backscattered and/or secondary electrons 131 emanating from the surface of the sample 120. In one embodiment, the electron detector assembly 134 includes an electron detector array. In this regard, the electron detector assembly 134 may include an array of electron-detecting portions. Further, each electron-detecting portion of the detector array of the electron detector assembly 134 may be positioned to detect an electron signal from sample 120 associated with one of the incident electron beams 129. The electron detector assembly 134 may include any type of electron detector known in the art. For example, the electron detector assembly 134 may include a microchannel plate (MCP), a PIN or p-n junction detector array, such as, but not limited to, a diode array or avalanche photo diodes (APDs). By way of another example, the electron detector assembly 134 may include a high-speed scintillator or a photomultiplier tube (PMT) detector.

While FIG. 2B illustrates the electron-based inspection tool 102*b* as including an electron detector assembly 134 comprising only a secondary electron detector assembly, this is not to be regarded as a limitation of the present disclosure. In this regard, it is noted that the electron detector assembly 134 may include, but is not limited to, a secondary electron detector, a backscattered electron detector, and/or a primary electron detector (e.g., an in-column electron detector). In another embodiment, electron-based inspection tool 102 may include a plurality of electron detector assemblies 134. For example, system 100 may include a secondary electron detector assembly, a backscattered electron detector assembly, and an in-column electron detector assembly.

In another embodiment, as described previously herein, the system 100 includes a user interface 110 communicatively coupled to the controllers 104a-n. In another embodiment, the user interface 110 includes a user input device (e.g., mouse and keyboard) and a display (e.g., monitor). The user input device of the user interface 110 may be configured to receive one or more input commands from a user, the one or more input commands configured to input data into system 100 and/or adjust one or more characteristics of system 100. In another embodiment, the display of the user interface 110 may be configured to display data of system 100 to a user.

In some embodiments, the image data 125 may be collected by swathing. Swathing may entail scanning the detector 126 or 134 over the sample 120 in a horizontal direction (e.g., a positive x-direction), then stepping in a vertical direction (e.g., y-direction), and again scanning the detector in a horizontal direction (e.g., a negative x-direction). In this way, the detector 126 or 134 may scan over the wafer 120 in a serpentine pattern. In some embodiments, the stage 122 may translate in the serpentine pattern such that the sample 120 scans under the detector 126 or 134 (i.e., the stage 122 moves while the detector 126 or 134 stays in place).

A swath may comprise an image that captures a portion of a row of dies on a semiconductor wafer. Each row of dies may require several swathes to completely image. For example, one swath may capture $\frac{1}{6}^{th}$ of the area of the row of dies. In one embodiment, a swath may have a height of about 8192 pixels, however the height of a swath is not limited thereto. A swath of images may be partitioned into subswathes. In one embodiment, a swath having a height of 8192 pixels is partitioned into eight subswathes. Each of the eight subswathes may have a height of about 1024 pixels, although the height of a subswath is not limited thereto. The detector 126 or 134 may include several taps, where each tap is associated with a subswath. In one embodiment, the detector 126 or 134 includes eight taps (i.e., eight streams of data) and captures eight subswathes per horizontal scan across a wafer. It is noted herein that the present invention is not limited to semiconductor wafers, and may be applied to, for example, photomasks or reticles.

The image data 125 (e.g., swathes, subswathes, etc.) may be transmitted to a shared memory. The shared memory may be configured to store the image data 125 for high-speed retrieval by the controllers 104. In other embodiments, the inspection tool 102 may transmit the image data 125 directly to any of the controllers 104. The swathes, subswathes, and/or portions of the subswathes, may be partitioned into test images. The test images may then be bundled as a part of an inspection job (e.g., an isolated inspection task or workload) which may be distributed to various image modules 107 to be inspected for defects. Each inspection job may be associated with, for example, a test image, one or more reference images for the test image, and any context data required for that inspection job (for example, the probability of a defect type occurring in the test image).

Each image associated with an inspection job may capture the same corresponding area between each die (for example, a rectangular area in the top left corner of each die) having the same design pattern. The area may be equal to 2% of each die, 10% of each die, etc. The area (or part of the area) may be designated as a care area (i.e., area-of-interest) based on a calculated probability of the defect occurring in the care area. The calculated probability may be stored as an attribute in an entry of the list of the results module 103. Additionally or alternatively, the care area may be designated based on the outputs of the defect-inspection algorithms. For example, a Boolean value representing the detection of at least one defective pixel ("Yes" or "1") or the detection of zero defective pixels ("No" or "0") may be stored in the list of the results module 103. Additionally or alternatively, a floating point value representing a probability percentage (i.e., 0.5, 50%, 0.2, 20%, etc.) of a defect occurring may be stored in the list of the results module 103.

Due to the substantially large amount of the image data 125 (potentially millions of pixels per swath), it may be desirable to match the data processing rate to the data acquisition rate (or, exceed the data acquisition rate). The data processing rate may be the rate at which the controller(s) 104 processes the image data 125, and the data acquisition rate may be the rate at which the image data 125 is received by the shared memory from the inspection tool 102. In some embodiments, if the data acquisition rate exceeds the data processing rate, the image data 125 may be partitioned or downsampled (e.g., flexibly sampled) such that less data needs to be processed. For example, fewer inspection jobs may be distributed to one or more of the image modules 107a-n by the sample plan module 105. Additionally or alternatively, additional image modules 107a-n may be recruited to process the excess image data 125.

The sample plan module 105 may be configured to select inspection jobs to be distributed to the image modules 107a-n. In some embodiments, the inspection jobs are distributed based on the list of the results module 103. The sample plan module 105 may control parameters such as the number of reference images per inspection job, or an area-of-interest to be analyzed for defects. In some embodiments, the sample plan module 105 may execute a predetermined and static (e.g., defined by a user) sample plan. In some embodiments, the sample plan module 105 may distribute the inspection jobs dynamically (e.g., adjustable at run-time) based on a function of data generated or imported during the inspection of the sample 120 (or previously inspected samples 120).

In some embodiments, an inspection job may be generated by the sample plan module 105 based on the historical presence of a type of defect (e.g., a scratch defect, pin-hole defect, bridge defect, etc.) on care areas of the sample 120. In some embodiments, an inspection job may be generated by the sample plan module 105 based on probabilities of defects of a certain type occurring on the sample 120. For example, the inspection job may be based on a pattern-of-interest (e.g., care area) prone to specific types of defects. The patterns-of-interest may be defined by a user, or may be automatically generated by an algorithm. In this way, computational resources may be preserved by focusing on patterns most likely to contain defects, or patterns that are generally yield-limiting. In some embodiments, an inspection job may be generated based on design data (e.g., related to the design of circuits on the sample 120). In some embodiments, an inspection job may be generated based on process-related data (e.g., related to deposition, etching, polishing, etc.). The process-related data may be collected from several sources including simulation, accumulated data over time, and/or from the sample 120. In some embodiments, the process-related data may include metrology data (e.g., related to the measurement of overlay between different layers of the sample 120).

In some embodiments, at least one of the controllers 104 may be a virtual inspection device (VID). A VID may receive image data from a physical inspection device (PID) and analyze the data generated by the PID for specific types of defects. The VID may then transmit the results of the analysis back to the PID to provide a complete list of identified defects. In this way, the virtual inspection device is not directly coupled to any inspection tool 102. Virtual inspection devices are generally described in U.S. Pat. No. 9,222,895 entitled "Generalized Virtual Inspector" and granted on Dec. 29, 2015, and U.S. Pat. Appl. Publ. No. 2016/0150191 entitled "Virtual Inspection Systems for Process Window Inspection" and published on Nov. 20, 2015, which are both incorporated herein by reference in their entirety.

In some embodiments, the one or more defect-inspection algorithms may comprise a machine learning algorithm. In some embodiments, the machine learning algorithm is a supervised learning algorithm. In other embodiments, the machine learning algorithm is an unsupervised learning algorithm. The machine learning algorithms may be defined as a type of artificial intelligence (AI) that provides the controllers 104 with the ability to learn without being explicitly programmed. The machine learning algorithms may learn from data (i.e., the test images and reference images) and may make predictions based on the learning—such algorithms may overcome following strictly static program instructions by making data driven predictions through building a model from sample inputs.

In some embodiments, the machine learning algorithm utilizes a neural network. The neural network may include a set of weights that model the world according to data that has been input to train it. The relatively large collection of neural units of the neural network may loosely model the way a biological brain solves problems with relatively large clusters of biological neurons connected by axons. Each neural unit may be connected with many others, and links may be enforcing or inhibitory in their effect on the activation state of connected neural units. Machine learning programs may be self-learning and trained rather than explicitly programmed and may excel in areas where the solution or feature detection is difficult to express in a traditional computer program. A neural network may comprise of multiple layers, and a signal path may traverse from front to back. The neural network may include a few thousand to a few million neural units and millions of connections. The neural network may have any suitable architecture and/or configuration known in the art.

In some embodiments, the machine learning algorithm may utilize deep learning (i.e., deep structured learning, hierarchical learning or deep machine learning). In a deep learning network, there may be two sets of neurons: ones that receive an input signal and ones that send an output signal. When the input layer receives an input, it passes on a modified version of the input to the next layer. In a deep learning network, there may be a relatively large number of layers between the input and output, allowing the algorithm to use multiple processing layers, composed of multiple linear and non-linear transformations.

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controllers 104 may be communicatively coupled to one or more components of the inspection tool 102 via any wireline or wireless connection known in the art.

In one embodiment, the one or more processors 106 may include any one or more processing elements known in the art. In this sense, the one or more processors 106 may include any microprocessor-type device configured to execute algorithms and/or instructions. In one embodiment, the one or more processors 106 may be a component of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems (for example, in a cloud-computing system). Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, electron beam source 128, detector assembly 126, electron detector assembly 134, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the inspection tool 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that each the memory 108 may be housed in a common controller housing with each of the one or more processors 106, respectively. In an alternative embodiment, the memory 108 may be located remotely with respect to the physical location of the processors 106 and the controller(s) 104.

In some embodiments, a user interface 110 is communicatively coupled to the controllers 104a-n. In some embodiments, the user interface 110 may include, but is not limited to, one or more desktops, tablets, smartphones, smart watches, or the like. In some embodiments, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In some embodiments, a user may input selections and/or instructions responsive to data displayed to the user via a user input device of the user interface 110 (e.g., a mouse and keyboard).

Figure 3A:
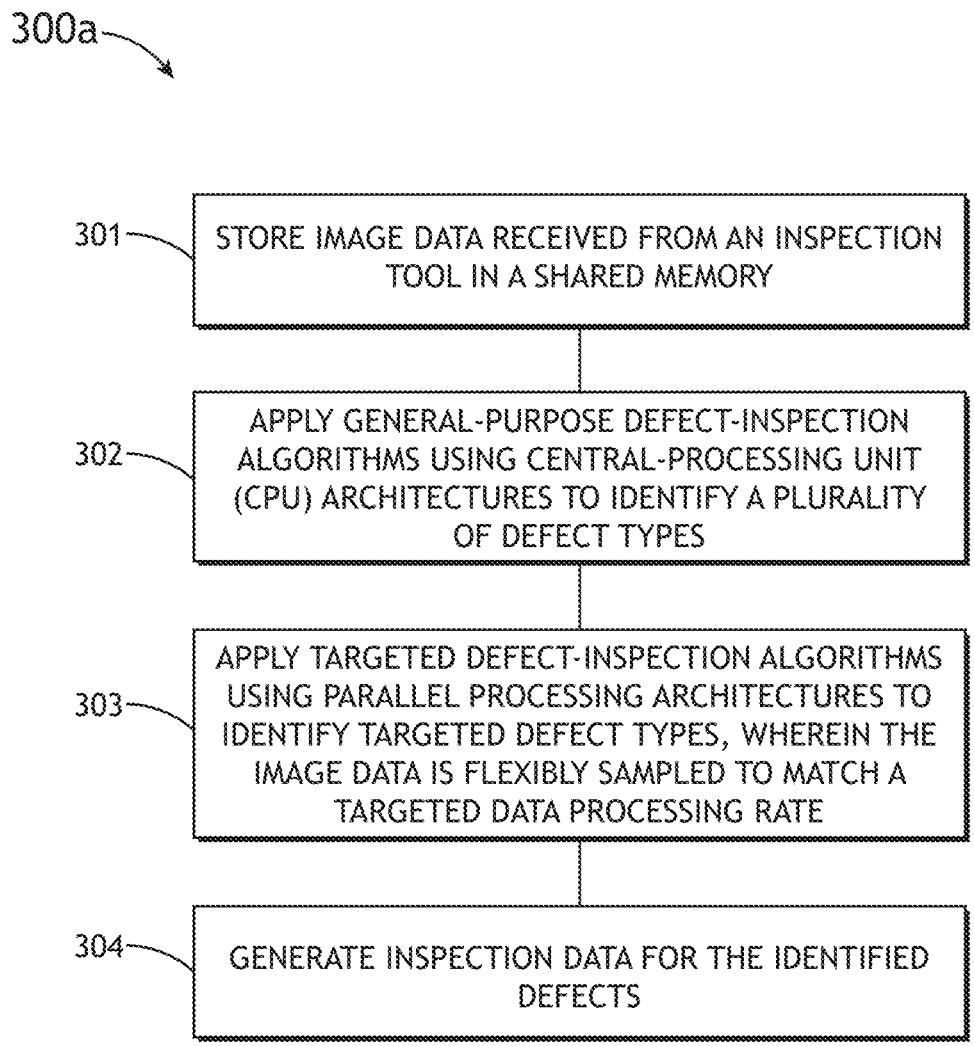
FIGS. 3A-3C are flowcharts illustrating inspection methods, in accordance with one or more embodiments of the present disclosure.

FIG. 3A illustrates a flowchart 300a for determining one or more defects on a sample, in accordance with one or more embodiments of the present disclosure. It is noted that in this embodiment, one or more secondary image modules 107b-n employ flexible sampling of the image data to match a data processing rate of the host image module 107a within a selected tolerance.

At step 301, illumination (e.g., illumination 101 of the inspection tool 102a or electron beams 129 of the inspection tool 102b) may be received from a sample (e.g., sample 120) using one or more detectors (e.g., detectors 126 or 134) communicatively coupled to a shared memory. One or more controllers (e.g., controllers 104) may be communicatively coupled to the shared memory. Each of the controllers may include one or more processors (e.g., processors 106) and a memory (e.g., memory 108). The memory may include program instructions configured to be executed by the processors.

At step 302, a host image module (e.g. image module 107a) may inspect the image data by applying general-purpose defect-inspection algorithms (e.g., the general-purpose algorithms executed by a CPU) to identify a plurality of defect types. The general-purpose algorithms may be configured to identify a wide variety of defect types (as opposed to being adapted for specific defect types). The host image module may be configured to inspect a full sample of the image data (as opposed to secondary image modules which may inspect a subsample of the full sample, e.g., a care area).

At step 303, one or more secondary image modules (e.g. image module 107b) may inspect the image data by applying special-purpose defect-inspection algorithms (e.g., targeted algorithms executed by a GPU or other non-CPU accelerator) tailored to identify a targeted subset of the plurality of defect types. The targeted subset may include known defect types (e.g., as opposed to unknown defect types identified by machine-learning). The one or more secondary image modules may be configured to inspect subsamples (e.g., care areas) of the full sample inspected by the host image module. In some embodiments, the one or more secondary image modules employ flexible sampling of the image data to match a data processing rate of the host image module within a selected tolerance (e.g., by dropping inspection jobs in a queue).

At step 304, a results module may be configured to generate inspection data for defects identified by the one or more host image modules or the one or more secondary image modules. For example, the results module may generate a list of defects identified by the general-purpose defect-inspection algorithm(s) and the targeted defect-inspection algorithm(s). The list of defects may report that zero defects are detected in an area of a wafer, that one or more defects are detected in an area of a wafer, etc.

Figure 3B:
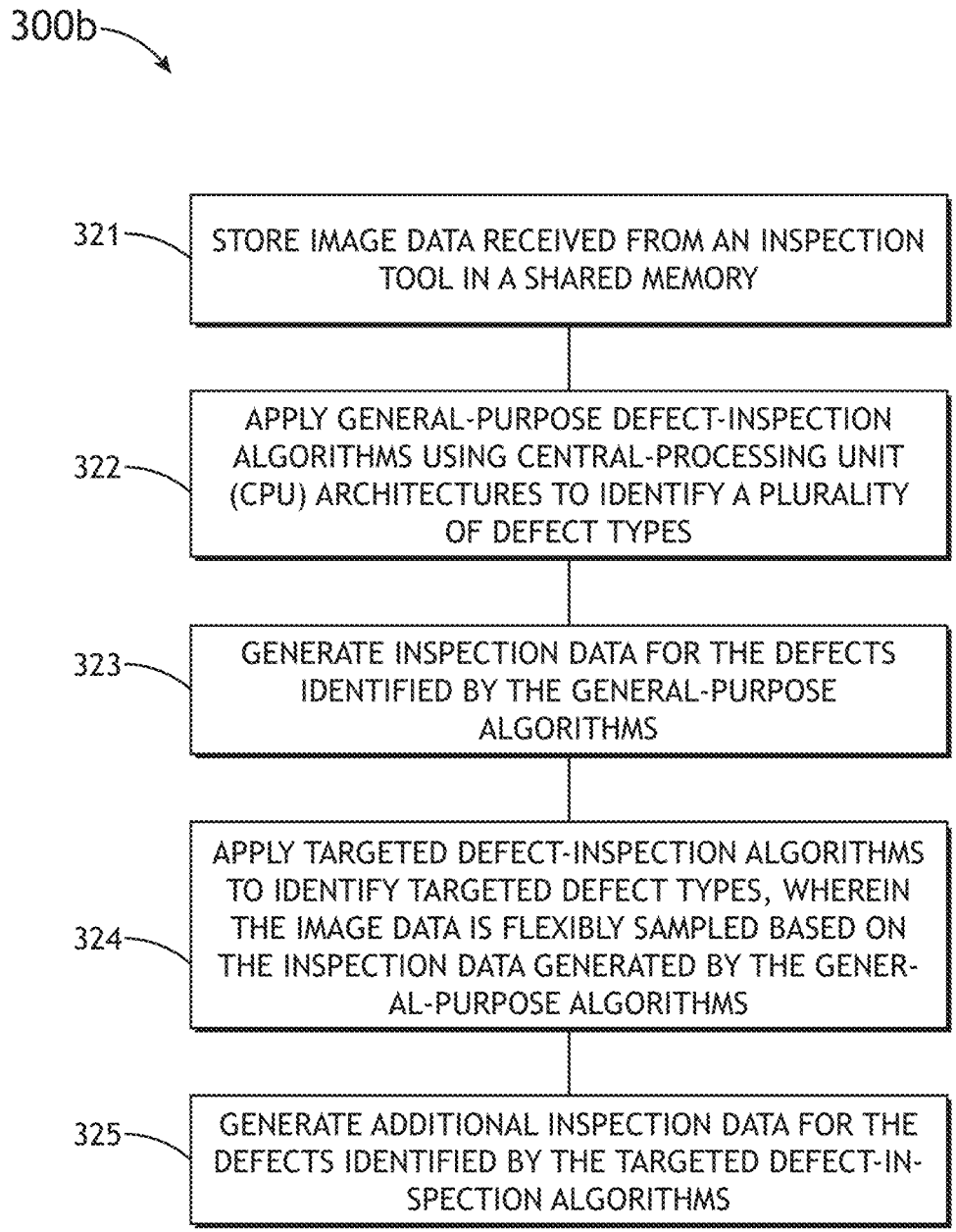

FIG. 3B illustrates a flowchart 300b for determining one or more defects on a sample, in accordance with one or more embodiments of the present disclosure. It is noted that in this embodiment, the one or more second image modules flexibly sample the image data based on the results of the first image module. The second image modules may process only inspection jobs (e.g., subsamples or care areas) selected or identified for further processing, instead of receiving a full sample of the image data.

At step 321, illumination (e.g., illumination 101 of the inspection tool 102a or electron beams 129 of the inspection tool 102b) may be received from a sample (e.g., sample 120) using one or more detectors (e.g., detectors 126 or 134) communicatively coupled to a shared memory. One or more controllers (e.g., controllers 104) may be communicatively coupled to the shared memory. Each of the controllers may include one or more processors (e.g., processors 106) and a memory (e.g., memory 108). The memory may include program instructions configured to be executed by the processors.

At step 322, a host image module (e.g. image module 107a) may inspect the image data by applying general-purpose defect-inspection algorithms (e.g., the general-purpose algorithms executed by a CPU) to identify a plurality of defect types. The general-purpose algorithms may be configured to identify a wide variety of defect types (as opposed to being adapted for specific defect types). The host image module may be configured to inspect a full sample of the image data (as opposed to secondary image modules which may inspect a subsample of the full sample, e.g., a care area).

At step 323, a results module may be configured to generate inspection data for defects identified by the one or more host image modules. For example, the results module may generate a list of defects identified by the general-purpose defect-inspection algorithm(s). The list of defects may report that zero defects are detected in an area of a wafer, that one or more defects are detected in an area of a wafer, etc.

At step 324, one or more secondary image modules (e.g. image module 107b) may inspect the image data by applying second defect-inspection algorithms (e.g., targeted algorithms executed by a GPU or other non-CPU accelerator) tailored to identify a targeted subset of the plurality of defect types. The targeted subset may include known defect types (e.g., as opposed to unknown defect types identified by machine-learning). The one or more second image modules may be configured to inspect subsamples (e.g., care areas) of the full sample inspected by the host image module. In some embodiments, the one or more secondary image modules employ flexible sampling of the image data to match a data processing rate of the host image module within a selected tolerance.

The flexible sampling of the image data may be adjusted in response to the inspection data generated by the results module and the host image module. For example, if zero or no defects are detected in a care area using a general-purpose defect-inspection algorithm, the targeted defect-inspection algorithms may verify or double-check the results of the general-purpose algorithm in the care area. Alternatively, if a care area is flagged as potentially containing defects using a general-purpose defect-inspection algorithm, the targeted defect-inspection algorithms may verify whether the general-purpose algorithm detected real defects instead of noise in the care area.

At step 325, the results module may be further configured to generate additional inspection data for defects identified by the one or more secondary image modules. For example, the results module may generate a list of defects identified by the general-purpose defect-inspection algorithm(s) and the targeted defect-inspection algorithm(s). The list of defects may report that zero defects are detected in an area of a wafer, that one or more defects are detected in an area of a wafer, etc.

Figure 3C:
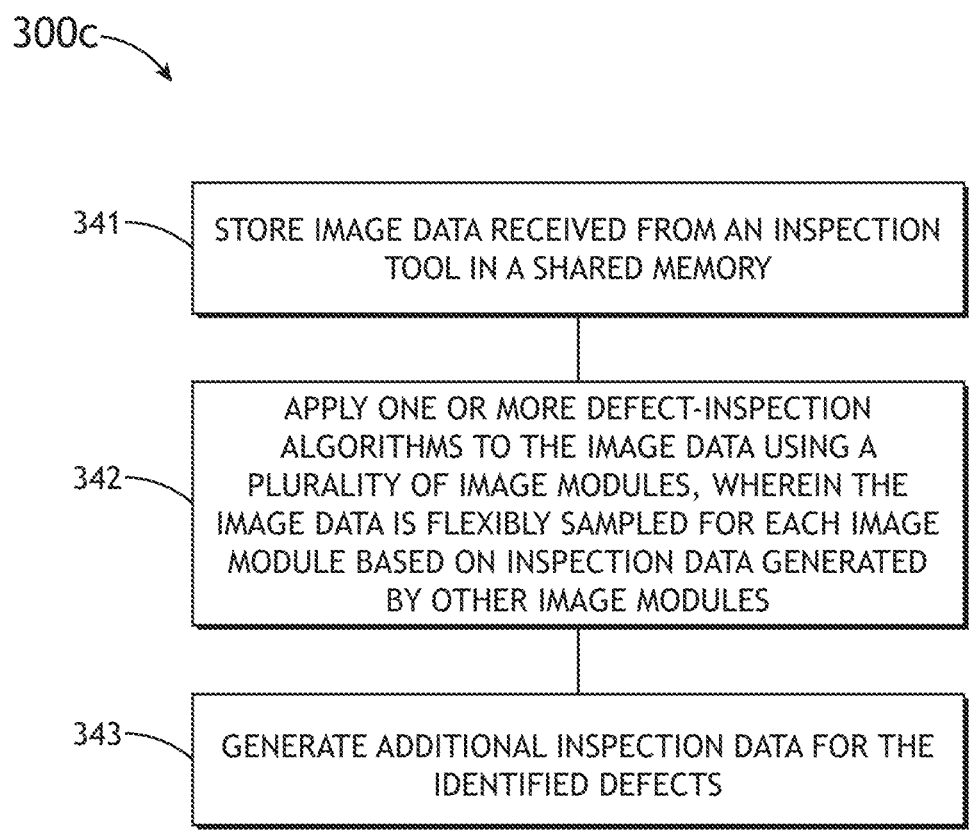

FIG. 3C illustrates a flowchart 300c for determining one or more defects on a sample, in accordance with one or more embodiments of the present disclosure. It is noted that in this embodiment, the outputs of all of the image modules influence the flexible sampling of every image module. In this way, the flexible sampling of each image module is not based merely on the results of one or two other image modules, but rather, the results of all of the image modules.

At step 341, illumination (e.g., illumination 101 of the inspection tool 102a or electron beams 129 of the inspection tool 102b) may be received from a sample (e.g., sample 120) using one or more detectors (e.g., detectors 126 or 134) communicatively coupled to a shared memory. One or more controllers (e.g., controllers 104) may be communicatively coupled to the shared memory. Each of the controllers may include one or more processors (e.g., processors 106) and a memory (e.g., memory 108). The memory may include program instructions configured to be executed by the processors.

At step 342, a plurality of image modules (e.g. image modules 107a-n) may inspect the image data by respectively applying defect-inspection algorithms (e.g., the general-purpose algorithms and/or the targeted algorithms). Each of the plurality of image modules may be configured to inspect a full sample of the image data or a subsample (e.g., a care area) of the full sample. In some embodiments, the one or more secondary image modules employ flexible sampling of the image data to maintain a targeted data processing rate (e.g., pre-defined by a user) within a selected tolerance. The flexible sampling of the image data may be adjusted in response to the inspection data generated by the results module.

At step 343, the results module may be further configured to generate inspection data for defects identified by the plurality of image modules. For example, the results module may generate a list of defects identified by the general-purpose defect-inspection algorithm(s) and the targeted defect-inspection algorithm(s). The list of defects may report that zero defects are detected in an area of a wafer, that one or more defects are detected in an area of a wafer, etc.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method(s) described above may include any other step(s) of any other method(s) described herein. In addition, each of the embodiments of the method(s) described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
    a shared memory communicatively coupled to a defect inspection tool, wherein the shared memory is configured to receive image data generated by the defect inspection tool; and
    a controller communicatively coupled to the shared memory including:
        a host image module, wherein the host image module comprises program instructions maintained in memory and configured to cause one or more processors to apply one or more general-purpose defect-inspection algorithms to the image data, wherein the one or more general-purpose defect-inspection algorithms are configured to identify a plurality of defect types in the image data using central-processing unit (CPU) architectures, wherein the host image module fully samples the image data;
        one or more secondary image modules, wherein the one or more secondary image modules comprise program instructions maintained in memory and configured to cause one or more processors to apply one or more targeted defect-inspection algorithms to the image data, wherein at least some of the one or more targeted defect-inspection algorithms are tailored to identify a targeted subset of the plurality of defect types in the image data, wherein the one or more secondary image modules employ flexible sampling of the image data to match a data processing rate of the host image module within a selected tolerance; and
        a results module, wherein the results module comprises program instructions maintained in memory and configured to cause one or more processors to generate inspection data for defects identified by the host image module or the one or more secondary image modules.

2. The inspection system of claim 1, wherein at least some of the one or more secondary image modules utilize CPU architectures to implement at least some of the one or more targeted defect-inspection algorithms.

3. The inspection system of claim 1, wherein at least some of the one or more secondary image modules utilize graphical-processing unit (GPU) architectures to implement at least some of the one or more targeted defect-inspection algorithms.

4. The inspection system of claim 1, wherein at least some of the one or more secondary image modules utilize non-CPU math accelerators to implement at least some of the one or more targeted defect-inspection algorithms.

5. The inspection system of claim 1, wherein at least some of the one or more secondary image modules utilize a neural network to implement at least some of the one or more targeted defect-inspection algorithms.

6. The inspection system of claim 1, wherein at least some of the one or more secondary image modules utilize deep-learning to implement at least some of the one or more targeted defect-inspection algorithms.

7. The inspection system of claim 1, wherein at least one of the one or more secondary image modules is configured to identify one or more known defect types of the plurality of defect types and is further configured to employ flexible sampling of the image data to sample one or more care areas in the image data.

8. The inspection system of claim 7, wherein the one or more care areas include portions of the image data associated with locations susceptible to the one or more known defect types.

9. The inspection system of claim 1, wherein the controller further includes a sample plan module configured to generate a plurality of inspection jobs based on the image data.

10. The inspection system of claim 9, wherein at least one of the one or more secondary image modules is configured to employ flexible sampling of the image data by disregarding one or more inspection jobs to match the data processing rate of the host image module within the selected tolerance.

11. The inspection system of claim 1, wherein the inspection data includes pixel-level data.

12. The inspection system of claim 1, wherein the inspection data includes separate datasets for at least some of the one or more general-purpose defect-inspection algorithms or at least some of the one or more targeted defect-inspection algorithms.

13. The inspection system of claim 1, wherein the inspection data includes a common dataset for the one or more general-purpose defect-inspection algorithms and the one or more targeted defect-inspection algorithms.

14. The inspection system of claim 13, wherein the inspection data for an identified defect includes an indication of which of the one or more general-purpose defect-inspection algorithms or the one or more targeted defect-inspection algorithms identified the identified defect.

15. An inspection system comprising:
    a shared memory communicatively coupled to a defect inspection tool, wherein the shared memory is configured to receive image data generated by the defect inspection tool; and
    a controller communicatively coupled to the shared memory including:
        a host image module, wherein the host image module comprises program instructions maintained in memory and configured to cause one or more processors to apply one or more general-purpose defect-inspection algorithms to the image data, wherein the one or more general-purpose defect-inspection algorithms are configured to identify a plurality of defect types in the image data using central-processing unit (CPU) architectures, wherein the host image module fully samples the image data;

a results module, wherein the results module comprises program instructions maintained in memory and configured to cause one or more processors to generate inspection data for defects identified by the host image module; and one or more secondary image modules, wherein the one or more secondary image modules comprise program instructions maintained in memory and configured to cause one or more processors to apply one or more targeted defect-inspection algorithms to the image data, wherein at least some of the one or more targeted defect-inspection algorithms are tailored to identify a targeted subset of the plurality of defect types in the image data, wherein the one or more secondary image modules employ flexible sampling of the image data to match a data processing rate of the host image module within a selected tolerance, wherein the flexible sampling of the image data is adjusted responsive to the inspection data generated by the results module and the host image module, wherein the results module is further configured to generate inspection data for defects identified by the one or more secondary image modules.

16. The inspection system of claim 15, wherein at least one of the one or more secondary image modules is configured to identify one or more known defect types of the plurality of defect types and is further configured to employ the flexible sampling of the image data to sample one or more care areas in the image data.

17. The inspection system of claim 16, wherein the one or more care areas include portions of the image data associated with locations susceptible to the one or more known defect types.

18. The inspection system of claim 16, wherein inspection data generated by the results module indicates zero or no defects in the one or more care areas inspected by the one or more general-purpose defect-inspection algorithms, wherein the one or more care areas are flexibly sampled from the image data for the one or more targeted defect-inspection algorithms based on the indication of zero or no defects in the one or more care areas inspected by the one or more general-purpose defect-inspection algorithms, wherein the one or more targeted defect-inspection algorithms verify the indication of zero or no defects in the one or more care areas inspected by the one or more general-purpose defect-inspection algorithms.

19. The inspection system of claim 16, wherein inspection data generated by the results module indicates at least one defect in the one or more care areas inspected by the general-purpose defect-inspection algorithms, wherein the one or more care areas are flexibly sampled from the image data for the targeted defect-inspection algorithms based on the indication of the at least one defect in the one or more care areas inspected by the one or more general-purpose defect-inspection algorithms, wherein the one or more targeted defect-inspection algorithms verify the indication of the at least one defect in the one or more care areas inspected by the one or more general-purpose defect-inspection algorithms, wherein the one or more targeted defect-inspection algorithms identify the at least one defect as having the one or more known defect types of the plurality of defect types.

20. The inspection system of claim 15, wherein at least some of the one or more secondary image modules utilize the CPU architectures to implement at least some of the one or more targeted defect- inspection algorithms.

21. The inspection system of claim 15, wherein at least some of the one or more secondary image modules utilize graphical-processing unit (GPU) architectures to implement at least some of the one or more targeted defect-inspection algorithms.

22. The inspection system of claim 15, wherein at least some of the one or more secondary image modules utilize non-CPU math accelerators to implement at least some of the one or more targeted defect-inspection algorithms.

23. The inspection system of claim 15, wherein at least some of the one or more secondary image modules utilize a neural network to implement at least some of the one or more targeted defect-inspection algorithms.

24. The inspection system of claim 15, wherein at least some of the one or more secondary image modules utilize deep-learning to implement at least some of the one or more targeted defect-inspection algorithms.

25. An inspection system comprising:

a shared memory communicatively coupled to a defect inspection tool, wherein the shared memory is configured to receive image data generated by the defect inspection tool; and a controller communicatively coupled to the shared memory including:

a plurality of image modules, wherein each image module comprises program instructions maintained in memory and configured to cause one or more processors to apply one or more respective defect-inspection algorithms to the image data;

a results module, wherein the results module comprises program instructions maintained in memory and configured to cause one or more processors to generate inspection data for defects identified by the plurality of image modules;

wherein the plurality of image modules employ flexible sampling of the image data to maintain a targeted data processing within a selected tolerance; and wherein the flexible sampling of the image data is adjusted responsive to the inspection data generated by the results module and the plurality of image modules, wherein at least one of the plurality of image modules is configured to apply one or more general-purpose defect-inspection algorithms to the image data, wherein the one or more general-purpose defect-inspection algorithms are configured to identify a plurality of defect types in the image data using central-processing unit (CPU) architectures, wherein at least one other of the image modules is configured to apply one or more targeted defect-inspection algorithms to the image data, wherein at least some of the one or more targeted defect-inspection algorithms are tailored to identify a targeted subset of the plurality of defect types in the image data.

26. The inspection system of claim 25, wherein at least one of the plurality of image modules is configured to identify one or more known defect types of the plurality of defect types and is further configured to employ the flexible sampling of the image data to sample one or more care areas in the image data.

27. The inspection system of claim 26, wherein the one or more care areas include portions of the image data associated with locations susceptible to the one or more known defect types.

28. The inspection system of claim 25, wherein the controller further includes a sample plan module configured to generate a plurality of inspection jobs based on the image data.

29. The inspection system of claim 28, wherein at least one of the plurality of image modules is configured to employ flexible sampling of the image data by disregarding one or more inspection jobs to maintain a targeted data processing rate within the selected tolerance.

* * * * *